*J. R. Burville.*
*Hydrostatic Scale.*
Nº 91,711. Patented Jan. 22, 1869.
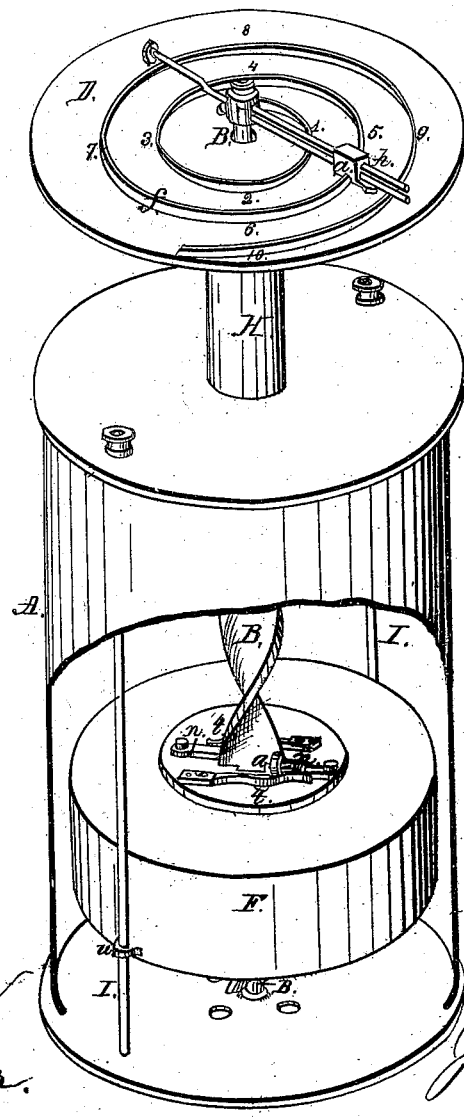
Witnesses.
P. F. Dodge
L. Hailer
Inventor;
James R. Burville
by Dodge & Munn
his Attys.

United States Patent Office.

JAMES R. BURVILLE, OF SPRINGFIELD, OHIO.

*Letters Patent No. 91,711, dated June 22, 1869.*

---

IMPROVEMENT IN HYDROSTATIC SCALE FOR WEIGHING CARGOES.

---

The Schedule referred to in these Letters Patent and making part of the same.

---

*To all whom it may concern:*

Be it known that I, JAMES R. BURVILLE, of Springfield, in the county of Clark, and State of Ohio, have invented certain new and useful Improvements in Instruments for Indicating the Weight of Loads on Vessels; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to that class of instruments used to indicate the weight of vessels and their loads; and It consists in a novel construction of the instrument, as hereinafter more fully described.

The drawing represents my improved instrument in perspective, with a portion of the case or tube broken away, to exhibit the internal construction.

To construct an instrument on my plan, I first provide a tube, A, of a length corresponding with the depth of the vessel, and within this tube I locate a central rod, B, which is flat, and twisted spirally, as shown in the drawing, this rod being journalled at top and bottom, so as to be free to turn easily.

Within the tube A, I also place a float, F, which may be of sheet-metal, and hollow, and which has through its centre, vertically, a slot of a proper size to permit the rod B to pass through it, and permit the float to slide freely up and down on said rod.

Extending vertically the length of the tube A, within it, at opposite sides, are two guide-rods, I, on which ears u, projecting from the sides of the float F, slide, thereby guiding the float in its movements, and preventing it from turning around as it rises or falls, as it would otherwise do.

To the top of the tube or case A, which need be only long enough to reach to the highest point at which the vessel, when loaded, will settle in the water, is secured a smaller tube, H, upon the top of which is secured, rigidly, a horizontal dial, D, the spiral rod B having its upper end formed into a simple round rod, and extending up through the tube H, and projecting above the dial D far enough to have an index-rod, h, secured transversely to it, as shown clearly in the drawing.

Upon the face of the dial is arranged a spiral projection or flange, f, and upon the rod h, which is made double, is placed, loosely, an index, a, which has a notch or recess in its under face, to fit upon the flange f, so that as the rod B is rotated, the index a will follow the course of, and be guided by the flange f.

In order that the float shall move freely, and not bind on the rod B, I secure to the upper side of the float F, a lever, n, pivoted at its outer end, and at its inner end having a friction-roller, o, which rests against the sides of the rod B, at the point where the contact of the rod and float would otherwise produce considerable friction, and thus tend to prevent the free working of the parts.

A spring, t, is arranged to force or hold the friction-roller up against the rod B, this arrangement of roller and spring being duplicated on opposite sides of the rod, as shown in the drawing, and, if desired, on top and bottom of the float.

It is obvious that this form of sliding index and dial may be applied to other styles of scales, and indicators also, as well as to this.

The operation is as follows:

A hole is made down through the vessel to the water, and the tube A is inserted therein, the lower end reaching down into the water, which enters through openings in the bottom of the tube A, and supports the float, the tube or case A being long enough, with the extension or smaller tube H, to bring the dial above the deck, or within the cabin, or any other desired point above the water-line.

As the vessel settles in the water, by the addition of its load, the float F will rise in the tube A, and as it rises, it will impart to the rod B a rotary motion, thereby causing the index-rod h to rotate also, and carrying the index a along with it, the latter being guided by the spiral flange f, and thus indicating, by its position, the weight of the load in tons, or any other denomination that may be adopted.

Each vessel is intended to be provided with an instrument, which may be permanently attached thereto, and each instrument must be adjusted to or graduated for the particular vessel on which it is to be used.

In graduating the instrument, it is first to be inserted and secured in place, the vessel being unloaded at the time, and the float resting on the water its entire weight.

While in this position, the place on the dial at which the index a points is to be marked zero.

Freight is then added, to the amount of a ton, and the point at which the index then stands will be marked 1, and so on, until the vessel is loaded to its greatest capacity.

When thus once graduated, the instrument is ready for use, and always thereafter, as the vessel is loaded or unloaded, the dial will indicate the amount of the load.

If preferred, the dial may be graduated to indicate the number of cubic feet of water displaced by the addition of the load to the vessel, and this number being multiplied by the weight, in pounds, of a foot of water, will give the weight of the load in pounds.

Having thus described my invention,

What I claim, is—

The apparatus for weighing or indicating the loads of vessels, consisting of a case or tube, A, open at its bottom or side, for the entry of the water, the float F, and spiral rod B, with the index and dial, arranged to operate as described.

JAMES R. BURVILLE.

Witnesses:
GEORGE W. DALIE,
D. A. HARRISON.